United States Patent [19]
Lee

[11] Patent Number: 5,815,227
[45] Date of Patent: Sep. 29, 1998

[54] BACKLIGHT FOR LIQUID CRYSTAL DISPLAY

[75] Inventor: Seok-won Lee, Kyungki-do, Rep. of Korea

[73] Assignee: Samsung Electronics Co., Ltd., Kyungki-do, Rep. of Korea

[21] Appl. No.: 699,513

[22] Filed: Aug. 16, 1996

[30] Foreign Application Priority Data

Dec. 27, 1995 [KR] Rep. of Korea ................. 1995-59512

[51] Int. Cl.⁶ ........................... G02F 1/1335; F21V 7/04
[52] U.S. Cl. .................. 349/67; 349/65; 362/31
[58] Field of Search .................. 349/65, 67, 62, 349/58; 362/31, 26

[56] References Cited

U.S. PATENT DOCUMENTS

| | | | |
|---|---|---|---|
| 5,280,372 | 1/1994 | Horiuchi | 349/65 |
| 5,335,100 | 8/1994 | Obata | 349/65 |
| 5,422,751 | 6/1995 | Lewis | 349/65 |

FOREIGN PATENT DOCUMENTS

| | | | |
|---|---|---|---|
| 531122 A2 | 3/1993 | European Pat. Off. | 349/65 |
| 4-62520 | 2/1992 | Japan | 349/65 |

Primary Examiner—William L. Sikes
Assistant Examiner—Tiep H. Nguyen
Attorney, Agent, or Firm—Cushman Darby & Cushman IP Group of Pillsbury Madison & Sutro LLP

[57] ABSTRACT

There is provided a backlight for an LCD, comprising a light-inducing plate installed on the bottom surface of the LCD, a lamp installed on one side portion of the light-inducing plate, to irradiate light to the LCD, and a lamp cover enclosing a part of the outer circumferential surface of the lamp, for reflecting the light from the LCD to the light-inducing plate, wherein the light-inducing plate and lamp cover are directly coupled with each other by a locking structure. Therefore, the simplification of the structure facilitates the backlight assembly, and the restriction on securing a space for receiving a conductive wire can be overcome.

10 Claims, 2 Drawing Sheets

BACKLIGHT FOR LIQUID CRYSTAL DISPLAY

BACKGROUND OF THE INVENTION

The present invention relates to a backlight used in a liquid crystal display and, more particularly, to a backlight for a liquid crystal display whose assembly efficiency is improved by substituting a lamp cover for a reflecting plate and a back cover.

As a display device, a liquid crystal display (LCD) is not luminous itself and generally requires a backlight for illumination. Accordingly, performance of the LCD is greatly dependent on the backlight employed.

As shown in FIG. 1, a conventional backlight for LCD use includes light-inducing plate 3 installed on the back side of LCD 1; lamp structure 9 having lamp 5 for emitting light and lamp holder 7 installed at either end of lamp 5 for fixing lamp on one side portion of light-inducing plate 3; reflecting plate 11, for reflecting the light emitted from lamp 5 onto light-inducing plate 3, being installed to enclose the outer circumferential surface of lamp structure 9; a support 13 for enclosing the upper surface and the side of reflecting plate 11 to support a subassembly constituted by light-inducing plate 3, lamp structure 9 and reflecting plate 11; and back cover 15 provided on the bottom surface of reflecting plate 11 to be opened and closed for lamp replacement.

The operation of the conventional backlight for LCD use will now be described. Some of the light emitted from lamp 5 is directly incident upon light-inducing plate 3, and the remaining light is reflected by reflecting plate 11 and then incident upon light-inducing plate. The light incident upon light-inducing plate 3 is refracted therein and is then irradiated toward the LCD 1, whereby LCD operates as a display device.

The conventional backlight, constructed as described above is assembled by providing light-inducing plate 3 and lamp structure 9 into support 13, inserting reflecting plate 11 between support 13 and lamp structure 9 to enclose lamp structure 9, and finally attaching back cover 15.

Here, reflecting plate 11 inserted between support 13 and lamp structure 9 must maintain a smooth reflecting surface. However, if reflecting plate 11 is made of silver (Ag) and is thin, a highly-precision work is required for inserting reflecting plate thereinto without it being buckled. In the case of buckling of reflecting plate 11, LCD brightness may deteriorate. Also, excessive time is required for assembling the backlight due to its configuration in combination with the various components.

Meanwhile, in the conventional backlight having the above structure, the power source for driving lamp 5 and the lamp itself are connected via a wire.

FIG. 2 is a perspective view for showing a wiring of the conventional backlight for LCD use, shown in FIG. 1. Here, reference numeral 17 is a power source; reference numeral 19 is an electrical wire connected to one end of lamp 5 and the positive pole of power source 17 to apply voltage to lamp 5; and reference numeral 21 is an electrical wire connected to the other end of lamp 5 and negative pole of power source 17.

Here, lamp 5 is filled with argon gas and mercury vapor as in a typical fluorescent lamp. As voltage is applied across lamp, an electrical discharge occurs between the poles, thereby emitting visible light. As shown in FIG. 2, electrical wire 21 is interposed between reflecting plate 11 and support 13. Therefore, a space where wire 21 can be positioned must be provided, and a method for positioning wire 21 is needed. This complicates the wiring structure, which has been a restriction on the construction of conventional backlights for LCD use.

SUMMARY OF THE INVENTION

To solve the above problems, it is an object of the present invention to provide a backlight for LCD use which overcomes the spatial restriction and improves assembly efficiency.

To accomplish the above object, there is provided a backlight for an LCD, comprising a light-inducing plate installed on the bottom surface of the LCD, a lamp installed on one side portion of light-inducing plate (11,11); and to irradiate light to the LCD, and a lamp cover enclosing a part of the outer circumferential surface of lamp (11,11) for reflecting the light from the LCD to light-inducing plate, wherein the light-inducing plate and lamp cover are directly coupled with each other by a locking structure.

It is preferable that the locking structure is comprised of a locking protrusion formed on at least one of the upper and bottom surfaces of light-inducing plate and a locking hole in a corresponding portion of lamp cover, and that the inner surface of lamp cover is coated with a high reflectivity material to reflect light emitted from the lamp.

Also, it is preferable that the high reflectivity material is one of silver and a high-reflectivity resin.

Meanwhile, preferably, lamp cover has a wire support formed on the upper surface thereof, for supporting a wire used in providing electrical power to the lamp, and the wire support has an L-like or U-like section.

In the backlight according to the present invention, the simplification of the structure facilitates its assembly. Since the conductive wire is disposed on the hook formed on the surface of lamp cover, the restriction of allotting space for receiving the conductive wire, in the conventional design, and is overcome.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
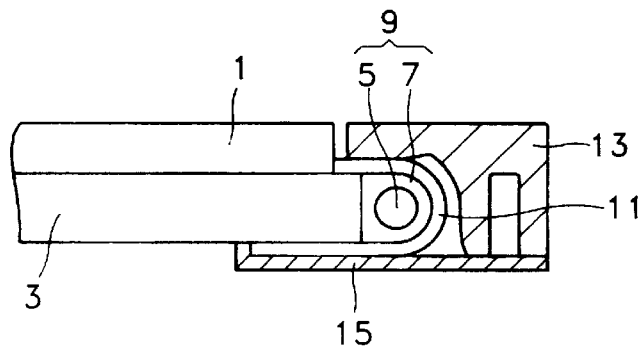
FIG. 1 is a cross-sectional view for showing the structure of a conventional backlight for LCD use.
Figure 2:
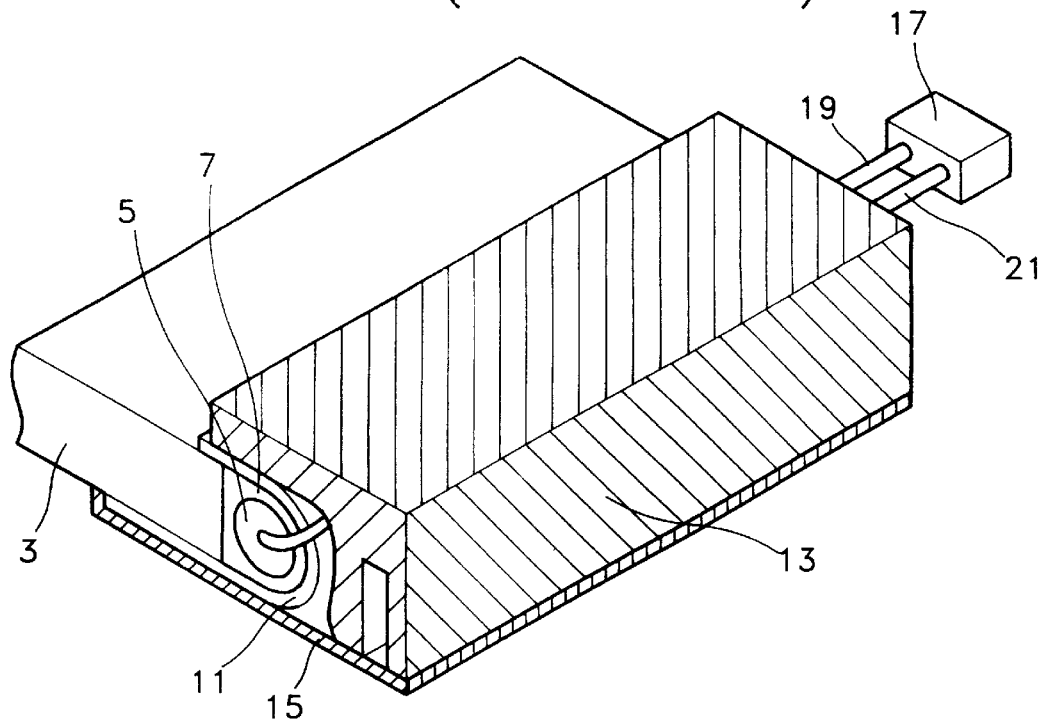
FIG. 2 is a perspective view for showing a wiring of the conventional backlight for LCD use in FIG. 1.
Figure 3:
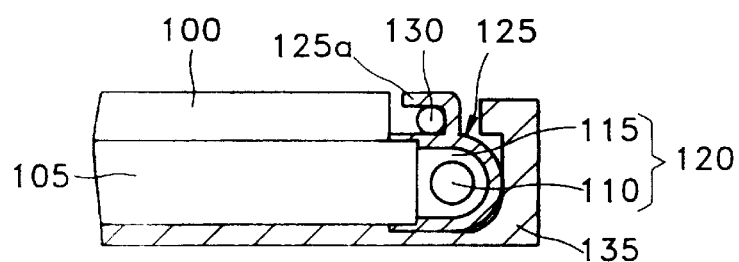
FIG. 3 is a cross-sectional view for showing the structure of a backlight for LCD use according to an embodiment of the present invention.
Figure 4:
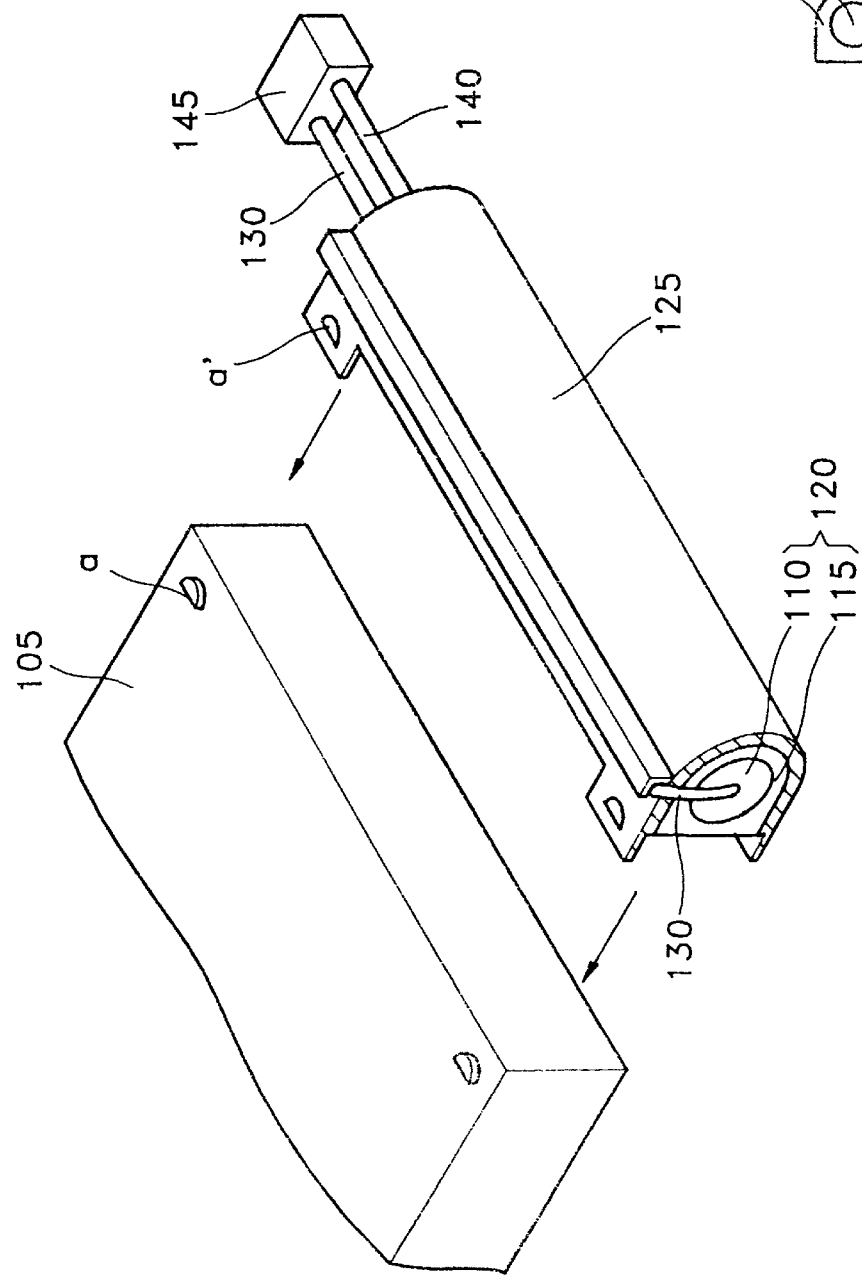
FIGS. 4 and 5 are, respectively, exploded perspective and partial cross-sectional views for illustrating a method of assembling the backlight for LCD use in FIG. 3.

As shown in FIGS. 3 and 4, a backlight for LCD use according to an embodiment of the present invention includes light-inducing plate 105 installed on the bottom surface of LCD 100; lamp structure 120 having lamp 110 for emitting light and lamp holder 115 installed at either end of lamp 110 for fixing lamp 110 to one side portion of light-inducing plate 105; lamp cover 125 installed to enclose the outer circumferential surface of lamp structure 120 and having wire support 125a for supporting first wire 130 positioned on its upper surface; and support 135 which shields the side and bottom surfaces of lamp cover 125 to support a subassembly constituted by light inducing plate 105, lamp structure 120 and lamp cover 125.

The first wire 130 is connected to one side of lamp 110 to apply voltage.

The wire support 125a has an L-like section. Alternatively, wire support 125a may have other sections, for example, a U-like section.

As shown in FIG. 4, the open side of lamp cover 125 is overlapped and coupled with light-inducing plate 105. For this coupling, a locking protrusion a and a locking hole a' are formed on at least one of the upper and lower surfaces of light-inducing plate 105 and a corresponding portion of lamp cover 125, respectively.

Figure 5:
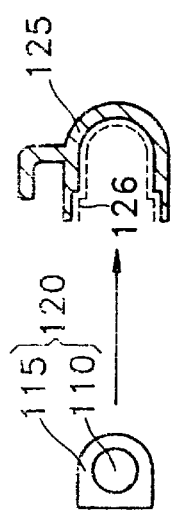

It is preferable that lamp cover 125 is coated with layer 126 of a high reflectivity material (e.g., silver) on its inner surface to reflect light emitted from lamp 110, and that the cross-section of lamp cover 125 is shaped in a form where luminance can be raised, for example, a semicircular form as in the conventional reflecting plate (see FIG. 5). Furthermore, lamp cover 125 can be extruded with a material such as a high reflectivity resin.

Referring to FIGS. 4 and 5, A method of assembling the backlight for LCD use, of FIG. 3 will now be described with references to FIGS 4 and 5. Here, reference numeral 140 is a second wire connected to the other side of lamp 120 to apply voltage thereto. Reference numeral 145 is a power source connected to lamp 110 via first and second wires 130 and 140.

According to the method of assembling the backlight constructed as above, first, lamp structure 120 provided with lamp 110 and lamp holder 115 is coupled to semicircular lamp cover 125 having the high reflectivity material layer 126 coated on its inner surface. Next, the resultant structure is coupled to light inducing plate 105. At this time, lamp cover 125 and light inducing plate 105 are locked to each other by the locking protrusion a and locking hole a'.

The wiring of the backlight will now be described with reference to FIGS. 3 and 4. One end of lamp 110 opposite the power source is connected to the positive or negative pole of power source 145 by first wire 130 supported by wire support 125a of lamp cover 125, and the other end is connected to the negative or positive pole of power source 145 by second wire 140, thereby providing voltage from the power source. That is, unlike the conventional art, since the conductive wire (first wire) for providing voltage to the lamp 110 is located on lamp cover 125, an additional space for receiving the wire is not needed between support 135 and lamp cover 125.

As described above, according to the backlight of the present invention, since lamp cover and light inducing plate are coupled by the locking structure, they are not easily jarred by external impact, and the assembly thereof and lamp exchange are easy.

Next, since the conventional reflecting plate and the back cover are substituted by lamp cover, the construction is simplified to reduce production costs.

Also, since the wire support is formed on the upper surface of lamp cover, it is easy to arrange the conductive wire. Therefore, the conventional restriction on securing a space for receiving the conductive wire can be overcome.

The present invention is not limited to the above embodiment, and it is apparent that various changes may be effected by those skilled in the art within the technical spirit of the present invention.

What is claimed is:

1. A backlight for LCD, comprising:
   a light-inducing plate installed on the bottom surface of said LCD;
   a lamp installed on one side portion of said light-inducing plate, to irradiate light to said LCD; and
   a lamp cover enclosing a part of an outer circumferential surface of said lamp, for reflecting light from said lamp to said light-inducing plate;
   wherein said light-inducing plate and said lamp cover are directly coupled with each other by a locking structure, said locking structure being comprised of:
      a locking protrusion formed on at least one of upper and bottom surfaces of said light-inducing plate; and
      a locking hole formed on a corresponding portion of said lamp cover.

2. A backlight for LCD as claimed in claim 1, wherein said lamp cover is formed of a high reflectivity material.

3. A backlight for LCD as claimed in claim 2, wherein said high reflectivity material is one of silver and a high-reflectivity resin.

4. A backlight for LCD as claimed in claim 1, wherein the inner surface of said lamp cover is coated with a high reflectivity material to reflect light emitted from said lamp.

5. A backlight for LCD as claimed in claim 4, wherein said high reflectivity material is one of silver and a high-reflectivity resin.

6. A backlight for LCD as claimed in claim 1, wherein the inner surface of said lamp cover has a semicircular section to facilitate the reflection of light emitted from said lamp.

7. A backlight for LCD as claimed in claim 1, wherein said lamp cover has a wire support formed on the upper surface thereof, for supporting a wire used in providing electrical power to said lamp.

8. A backlight for LCD as claimed in claim 7, wherein said wire support has an L-like or U-like section.

9. A backlight for LCD as claimed in claim 1, wherein a lamp holder is further provided at either edge of said lamp to fix said lamp.

10. A backlight for LCD as claimed in claim 1, wherein said locking protrusion extends from at least one of the upper and bottom surfaces of said light-inducing plate in a direction which is perpendicular to planes of at least one of the upper and bottom surfaces of said light-inducing plate.

* * * * *